(12) United States Patent
Kasai et al.

(10) Patent No.: US 7,419,372 B2
(45) Date of Patent: Sep. 2, 2008

(54) METHOD AND APPARATUS FOR CONTINUOUS MOLDING OF FIBER REINFORCED PLASTIC MEMBER WITH CURVATURE

(75) Inventors: Toru Kasai, Tokyo (JP); Makoto Okamoto, Tokyo (JP); Shuntaro Kuriyama, Tokyo (JP)

(73) Assignee: Jamco Corporation, Tokyo (JP)

(*) Notice: Subject to any disclaimer, the term of this patent is extended or adjusted under 35 U.S.C. 154(b) by 219 days.

(21) Appl. No.: 11/294,515

(22) Filed: Dec. 6, 2005

(65) Prior Publication Data

US 2006/0083806 A1 Apr. 20, 2006

Related U.S. Application Data

(62) Division of application No. 10/715,520, filed on Nov. 19, 2003, now Pat. No. 7,186,361.

(30) Foreign Application Priority Data

Aug. 8, 2003 (JP) ............................. 2003-289658

(51) Int. Cl.
*B29C 70/52* (2006.01)
(52) U.S. Cl. .................. 425/89; 425/145; 425/385; 425/392; 425/445; 156/441; 156/156
(58) Field of Classification Search ............... 425/145, 425/150, 161, 385, 392–393, 445, 89; 156/173–175, 156/180–181, 156, 166, 441, 443, 425, 459
See application file for complete search history.

(56) References Cited

U.S. PATENT DOCUMENTS 4,125,423 A * 11/1978 Goldsworthy ............... 156/428
4,909,886 A * 3/1990 Noguchi ..................... 156/285
5,648,027 A * 7/1997 Tajiri et al. .................... 264/43
6,042,685 A * 3/2000 Shinada et al. .............. 156/292
6,601,627 B2 * 8/2003 Kasai et al. .................. 156/441

FOREIGN PATENT DOCUMENTS

| EP | 1 116 575 A2 | 7/2001 |
| EP | 1 157 811 A2 | 11/2001 |
| EP | 1 157 811 A3 | 10/2002 |
| FR | 2 256 656 | 7/1975 |
| GB | 1044031 | 9/1966 |
| JP | 54-159476 A | 12/1979 |
| JP | 2-102029 | 4/1990 |
| JP | 06-039929 A | 2/1994 |

(Continued)

*Primary Examiner*—Yogendra Gupta
*Assistant Examiner*—Thu Khanh T Nguyen
(74) *Attorney, Agent, or Firm*—Westerman, Hattori, Daniels & Adrian, LLP.

(57) ABSTRACT

In a continuous molding apparatus equipped with a long core 10 having a curvature disposed on a plane, a release film supplied from a lower release film feeder 20 is sent onto the core 10, and prepreg sheets supplied from a prepreg sheet feeder 30 are laminated thereon and preformed. A release film supplied from a release film feeder 40 is disposed on top of the laminated body, before the body is sent into a hot press 50. A puller 60 moves the laminated body without loading tension thereto. The laminated body enters a postcure device 70 in which thermosetting of the material is completed.

3 Claims, 13 Drawing Sheets

FOREIGN PATENT DOCUMENTS

| | | |
|---|---|---|
| JP | 06-238758 A | 8/1994 |
| JP | 08-187788 A | 7/1996 |
| JP | 2001-191418 A | 7/2001 |
| JP | 2001-328130 A | 11/2001 |
| JP | 3402481 | 2/2003 |
| JP | 2004-106363 A | 4/2004 |

* cited by examiner

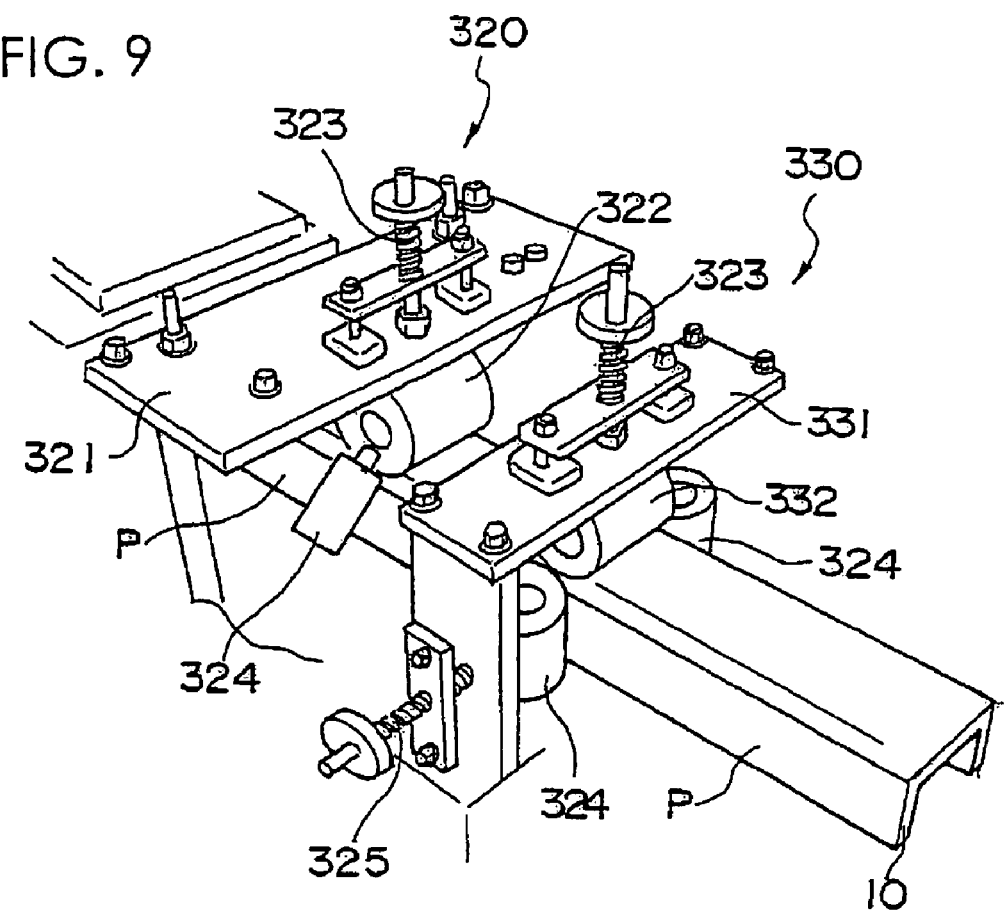

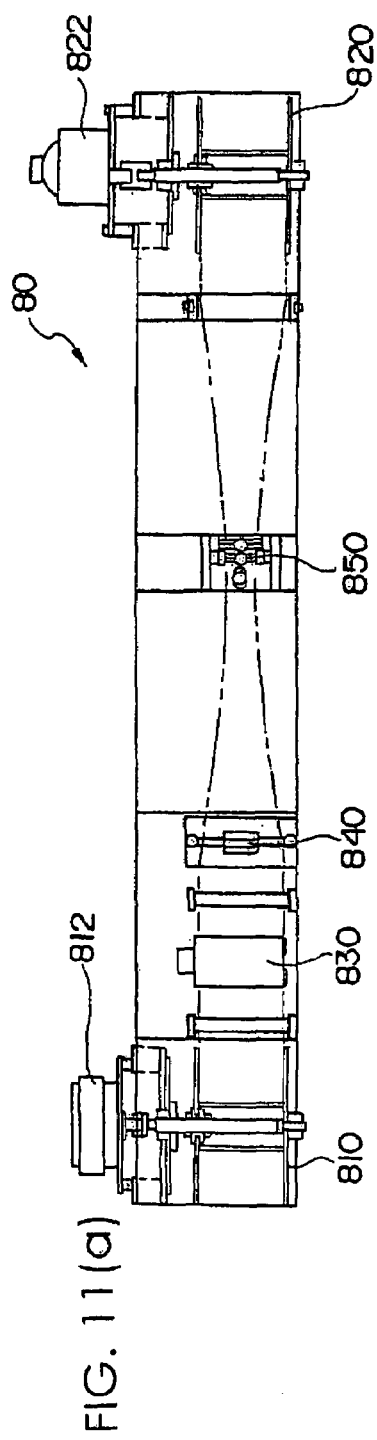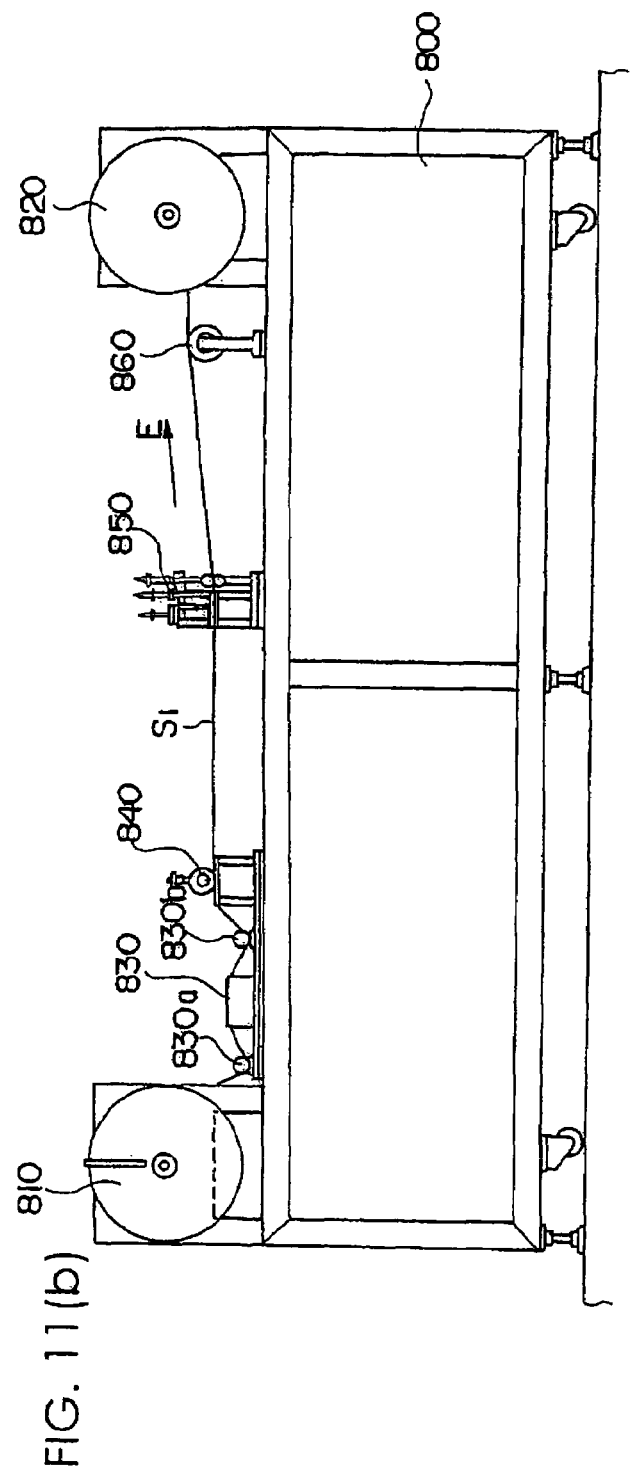
FIG. 11(a)
FIG. 11(b)

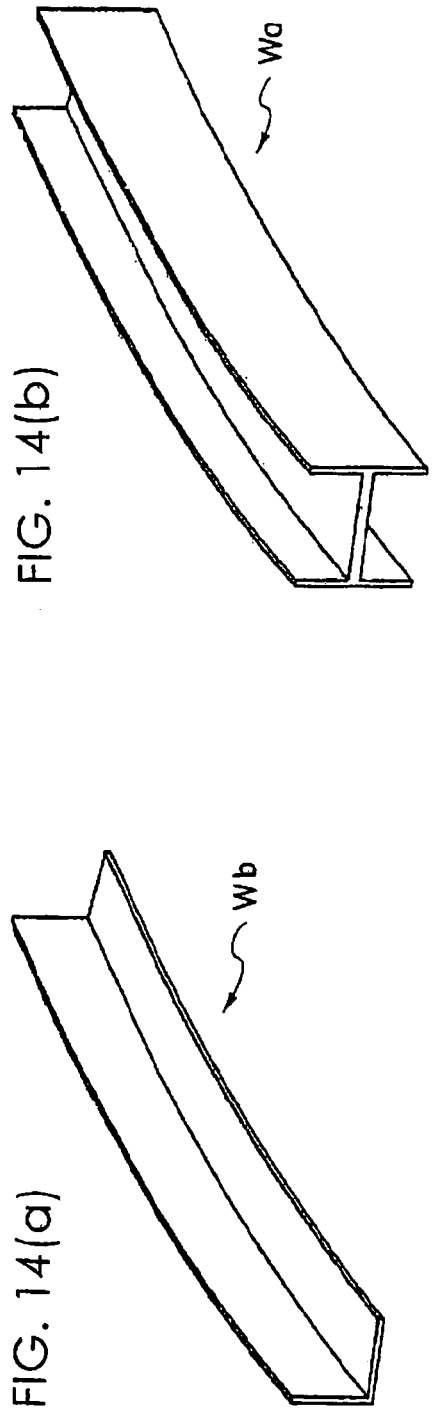
FIG. 14(b)
FIG. 14(a)
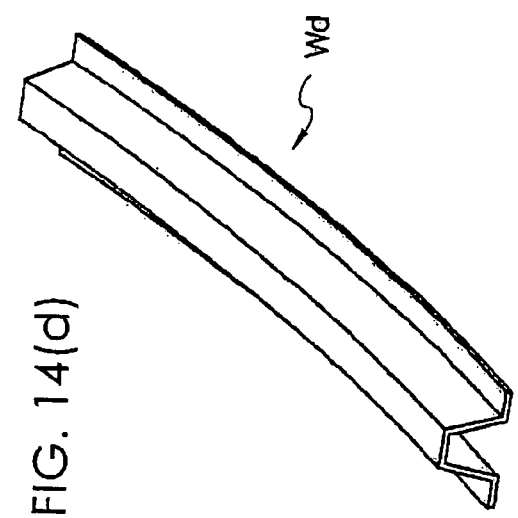
FIG. 14(d)
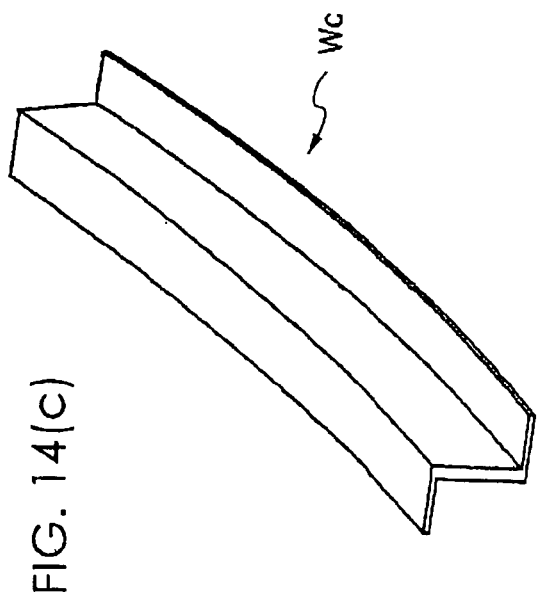
FIG. 14(c)

METHOD AND APPARATUS FOR CONTINUOUS MOLDING OF FIBER REINFORCED PLASTIC MEMBER WITH CURVATURE

This application is a divisional application of U.S. Ser. No. 10/715,520, filed on Nov.19, 2003, which issued as U.S. Pat. No. 7,186,361, and which claims priority to Japanese Application JP2003-289658 filed on Aug.8, 2003.

FIELD OF THE INVENTION

The present invention relates to a method and apparatus for continuously molding a member made of fiber reinforced plastics (FRP) having a constant curvature, the FRP member having high strength and light weight suitable for application to aircrafts or the like.

DESCRIPTION OF THE RELATED ART

Conventionally, it was common to use aluminum material as reinforcement frame in the body of a jumbo jet or other aircrafts, but recently, replacement of the aluminum frame with fiber reinforced plastics containing carbon or glass fiber is considered, in order to reduce the weight of the frame member. The FRP member used in an aircraft is manufactured using a prepreg material in order to realize stable quality, and in general, after disposing a release film or other secondary material on a mold, the necessary number of prepreg sheets are sequentially laminated thereon, which is then heated and pressed in an autoclave to form a member. The present inventors own a patent related to the continuous molding of an FRP member having a constant curvature, which is disclosed in Japanese Patent No. 3402481 (patent document 1).

One very important factor that affects the property of the molded product formed by FRP is the orientation of the fibers contained therein. When the orientation of fiber is slanted for over 5 degrees with respect to the direction of tension, the strength of the member is deteriorated, and the member cannot exert the predetermined strength when load is placed thereon.

SUMMARY OF THE INVENTION

The present invention provides a method and apparatus for continuous molding that prevents tension from being loaded on the fiber during the processes, and prevents the orientational angle of fiber from varying greatly during curving of the prepreg that may cause deterioration of strength of the molded member.

The present invention is equipped with, as basic means, a core shaped to correspond to the shape of a molded member with a curvature and disposed on a plane, and comprises a step of feeding a release film deformed in advance to correspond to the curvature of the molded member, a step of feeding multiple sheets of semi-cured prepregs formed by impregnating carbon fiber or glass fiber with thermosetting resin, a step of laminating and deforming multiple layers of prepregs into a determined shape, a step of hot pressing the laminated and deformed release film and laminated member into a predetermined shape, and a step of postcuring the laminated member exiting the hot press, wherein pullers are disposed before and after the hot press to hold the laminated member and to introduce the member to the hot press, so that no tension is placed on the fiber of the prepreg while the hot pressing step is being performed.

According to the present invention, a fiber reinforced plastic member with a curvature is molded continuously while the meandering angle of the fiber in the prepreg is maintained small, so the present invention enables to manufacture a structural member with high strength and light weight.

BRIEF DESCRIPTION OF THE DRAWINGS

FIG. 9 is an explanatory view of the 45-degree bending roller and the 90-degree bending roller;

FIG. 11 is an explanatory view of the release film forming device;

FIG. 14 is an explanatory view showing other examples of the products formed according to the present invention.

DETAILED DESCRIPTION OF THE PREFERRED EMBODIMENT

A molded member formed of fiber reinforced plastics (FRP), the whole of which being designated by reference number 1, is a beam-shaped member comprising three surfaces $1a$, $1b$ and $1c$ with a channel-like cross section.

A center line $C_1$ of the surface $1a$ defining the bottom surface of a channel is curved in an arc having a radius $R_1$.

The radius of curvature $R_1$ is large, for example, around 15,000 mm. The FRP molded member is formed by laminating multiple prepreg sheets formed by impregnating reinforcing fiber such as carbon fiber or glass fiber with thermosetting plastic resin and semi-curing the same, and hot-pressing the laminated member to thereby continuously mold the member into a predetermined shape.

The molded member is then heated in a postcure device, so that thermosetting is completed.

Reinforcing fiber has advantageous tensile strength. Therefore, a plurality of prepreg sheets having reinforcing fibers arranged along the longitudinal direction of the member to be molded are laminated appropriately with sheets formed by weaving the reinforcing fibers so as to achieve the required strength.

Figure 1:
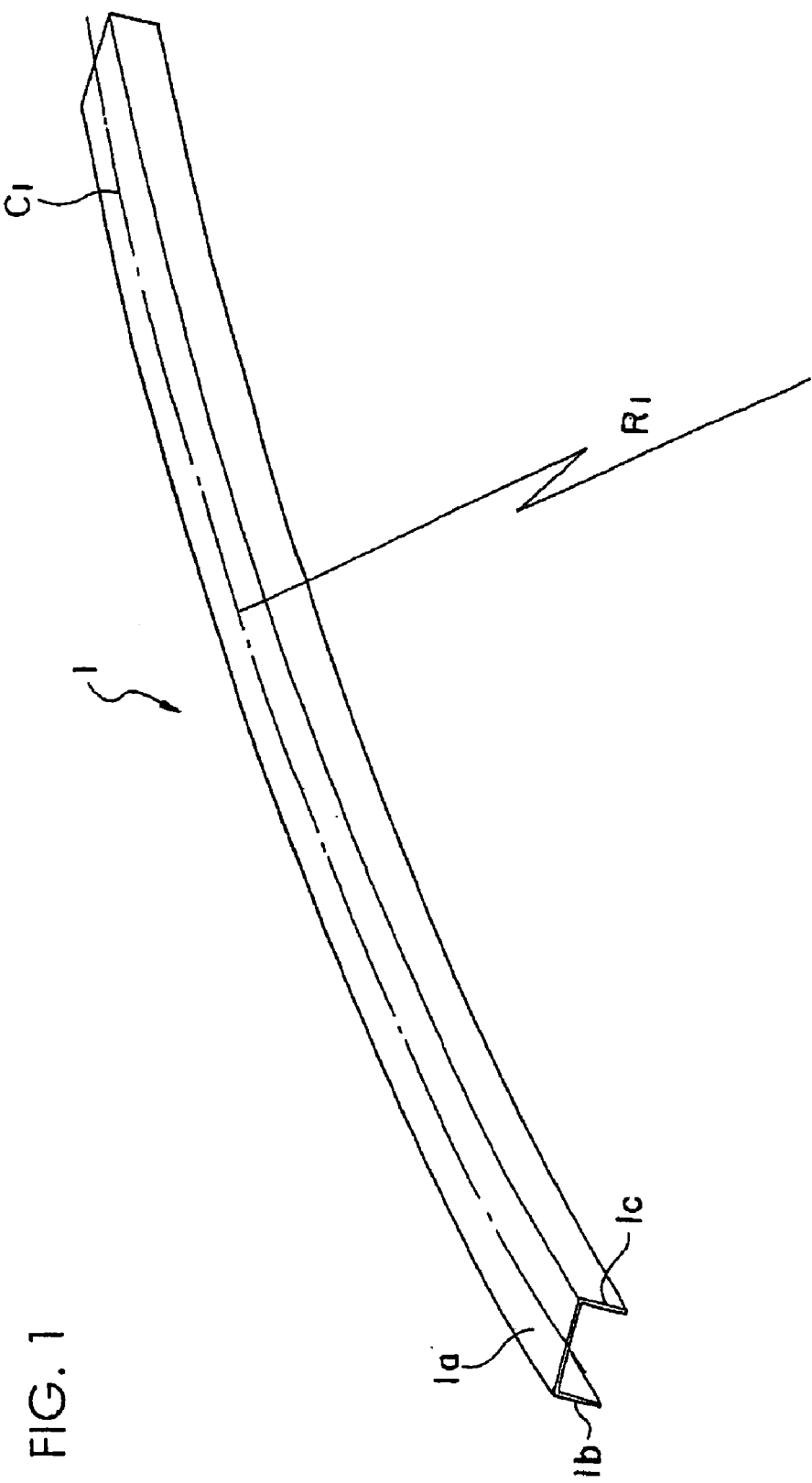
FIG. 1 is an explanatory view of an FRP member.
Figure 2:
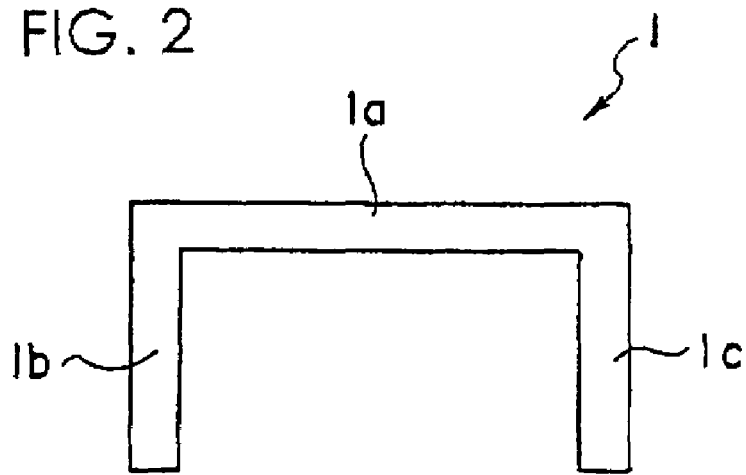
FIG. 2 is an explanatory view showing the cross-sectional structure of a member.
Figure 3:
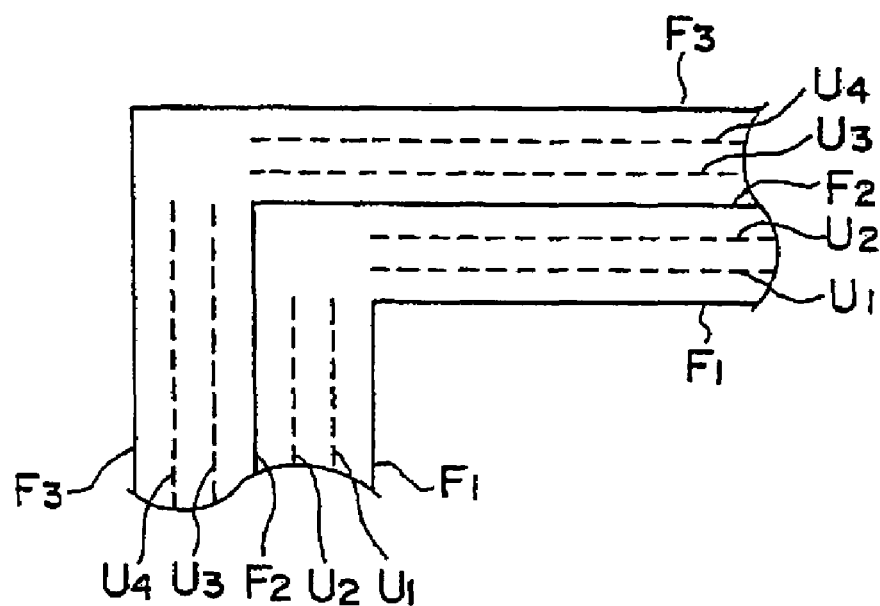
FIG. 3 is an explanatory view showing the cross-sectional structure of a member.

As shown in FIGS. 2 and 3, four unidirectional fiber sheets $U_1$, $U_2$, $U_3$, $U_4$ and three fabric sheets $F_1$, $F_2$, $F_3$ are laminated, and both sides of the laminated member are bent 90 degrees to form a channel member with three surfaces $1a$, $1b$ and $1c$.

Figure 4:
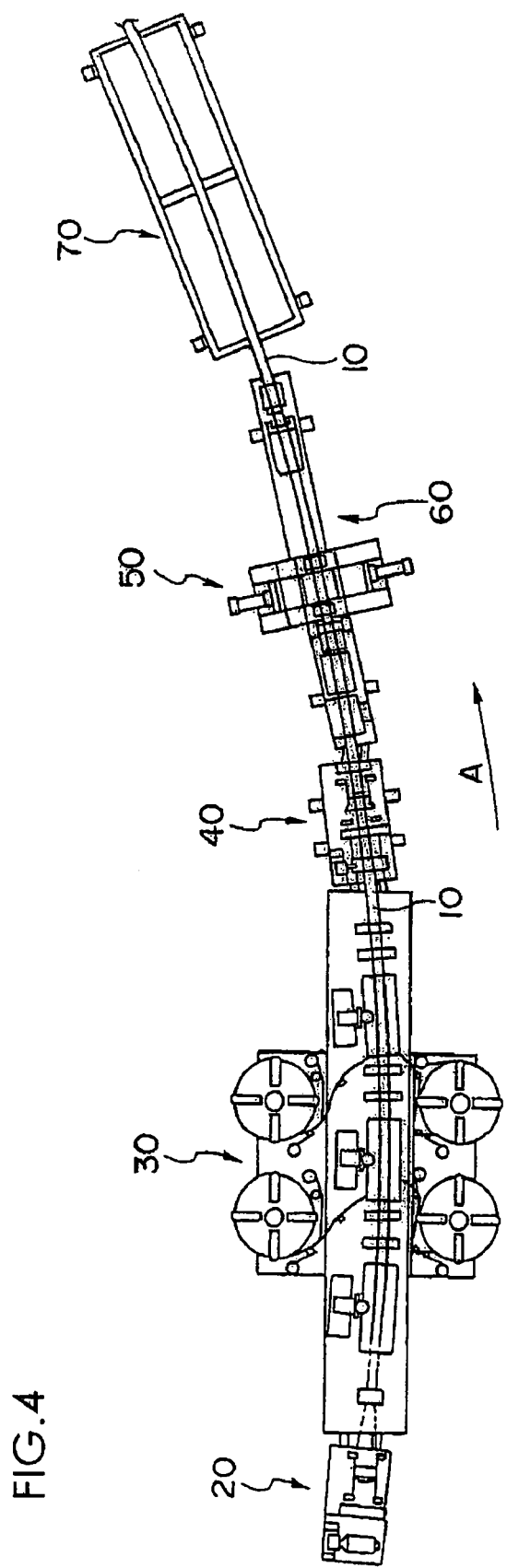
FIG. 4 is a plan view showing the continuous molding apparatus of FRP member.
Figure 5:
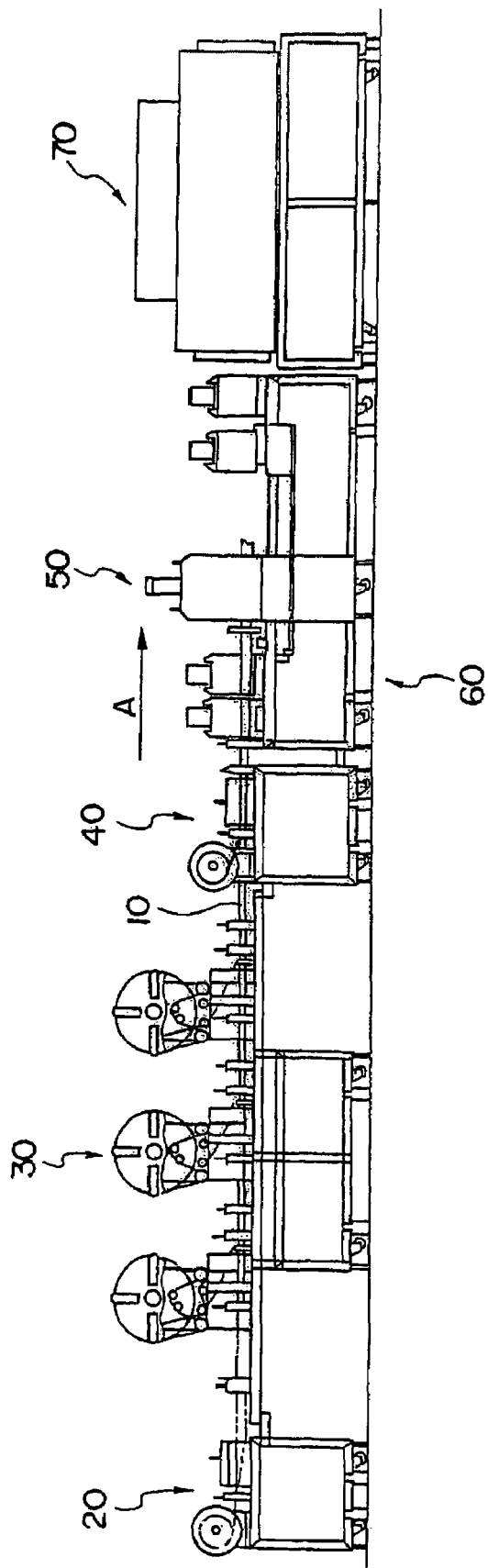
FIG. 5 is a front view showing the continuous molding apparatus of FRP member.

FIG. 4 is a plan view of a continuous molding apparatus of an FRP member according to the present invention, and FIG. 5 is a front elevation thereof.

A molding apparatus is for forming a channel member by continuously sending release films and fiber reinforced prepreg sheets fed from upstream toward the arrow A direction.

The molding apparatus comprises a core 10 having a cross sectional shape corresponding to that of the molded member and having a curvature corresponding to the curvature of the member being formed, and disposed along the core 10 are a lower release film supply device 20, a prepreg sheet feeder/preform device 30, an upper release film feeder 40, a hot press device 50, a puller 60 for pulling the molded member, and a postcure device 70.

The release films are disposed so as to sandwich the laminated body of prepreg sheets impregnated with thermosetting resin before it enters the hot press device, so as to prevent the thermosetting resin leaking from the prepreg sheets from adhering to the mold. The release films are removed from the molded member in the end.

The release films are curved in advance to correspond to the curvature of the molded member by a release film molding device mentioned later.

The prepreg sheet feeder/preform device 30 peels off separate films covering and preventing the prepreg sheets impregnated with adhesive agent from sticking to one another, and preforms the prepreg sheets along the core 10.

After disposing a release film fed from the upper release film supply device 40 on the upper surface of the material of the molded member being preformed along the core 10, the preforming step is completed.

The preformed laminated body is heated and pressed in the hot press device 50. If tension is placed on the laminated body during this step, the reinforcing fibers arranged within the laminated body with a curvature may be pulled and displaced from the line of curvature of the molded product.

Therefore, the molding apparatus of the present invention adopts a mechanism for holding the laminated body at positions before and after the hot press 50 so as to move the laminated body in synchronism to prevent tension from being placed on the body.

Figure 6A:
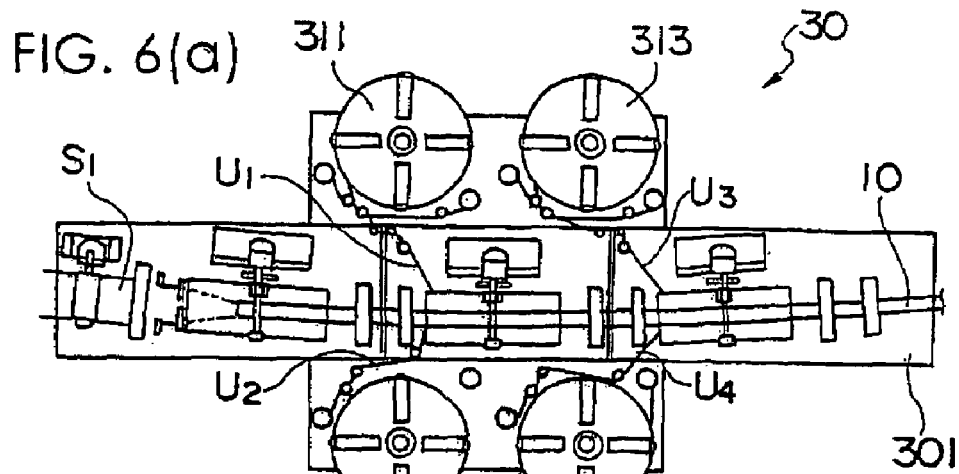
FIG. 6 show three side views of the prepreg sheet feeding/preform device.
Figure 6B:
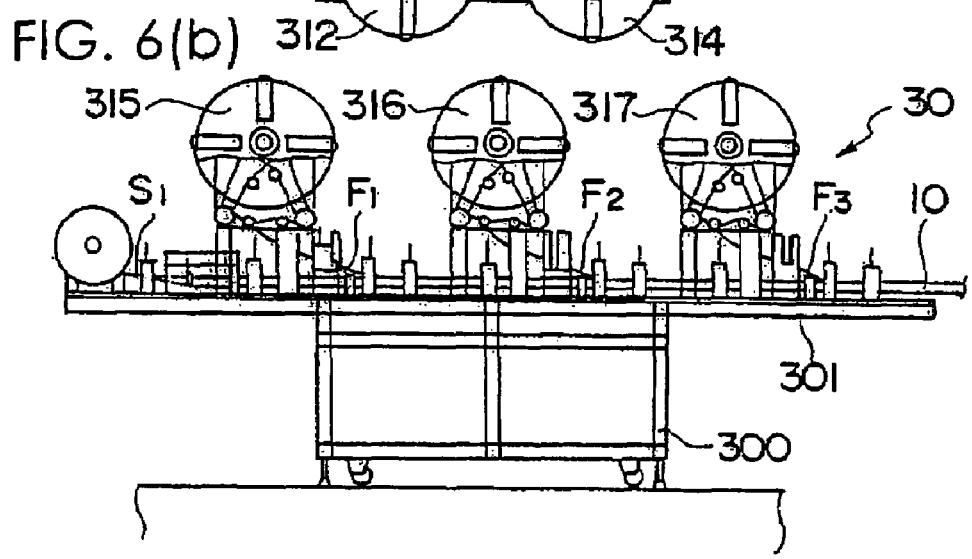
Figure 6C:
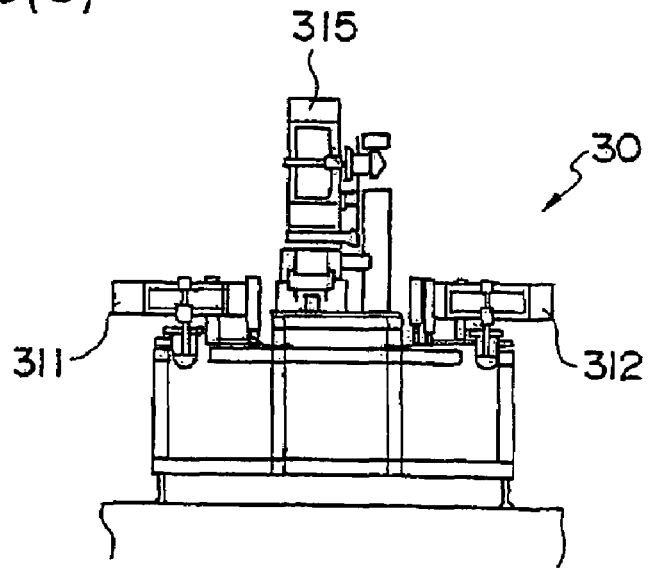
Figure 7:
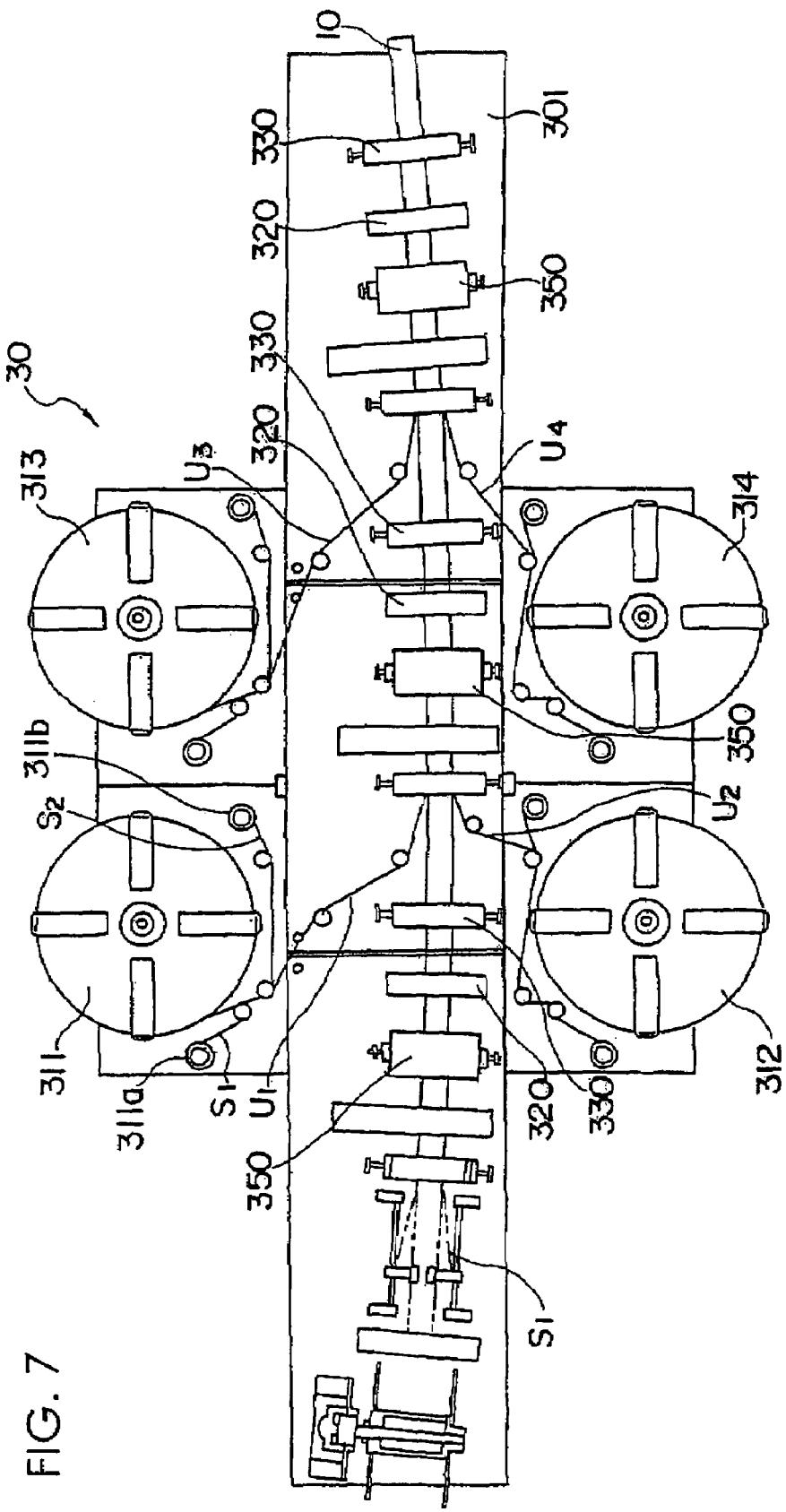
FIG. 7 is a plan view showing the details of the prepreg sheet feeding/preform device.

FIG. 6 shows three views of a prepreg sheet feeder/preform device, and FIG. 7 is a plan view showing the details of the device.

The prepreg sheet feeder/preform device designated as a whole by reference number 30 comprises a base 300, a table 301 disposed on the base, and a core 10 fixed above the table 301.

Above the base 300, four prepreg sheet feeders 311, 312, 313 and 314 are disposed within a horizontal plane. Similarly, three prepreg sheet feeders 315, 316 and 317 are disposed within a vertical plane.

Four prepreg sheet feeders 311, 312, 313 and 314 disposed within a horizontal plane are for supplying to a laminated body prepreg sheets $U_1$, $U_2$, $U_3$ and $U_4$ having reinforcing fibers arranged in unidirectional fashion, as explained with reference to FIG. 3.

The three prepreg sheet feeders 315, 316 and 317 disposed within a vertical plane are for supplying fabric prepreg sheets $F_1$, $F_2$ and $F_3$.

The prepreg sheets are tacky under room temperature. Therefore, thin plastic films called separate films are disposed on the front and back surfaces of each sheet in order to prevent the sheets from sticking when formed into a roll for feeding. When in use, the separate films are peeled off allowing the sheets to be laminated.

In FIG. 7, the prepreg sheet feeder 311 is equipped with a roll of prepreg sheet $U_1$ containing reinforcing fibers arranged unidirectionally (in the longitudinal direction), the roll having separate films $S_1$ and $S_2$ adhered to both sides of the prepreg sheet before it is formed into a roll.

Along with the feeding of the prepreg sheet $U_1$, the separate films $S_1$ and $S_2$ are reeled into rollers 311a and 311b, respectively.

The six other prepreg sheet feeders 312, 313, 314, 315, 316 and 317 are equipped with similar separate film reels, the detailed explanation of which is omitted.

The prepreg sheet feeder/preform device 30 comprises three sets of gathering rollers 350, 45-degree bending rollers 320, and 90-degree bending rollers 330.

Figure 8:
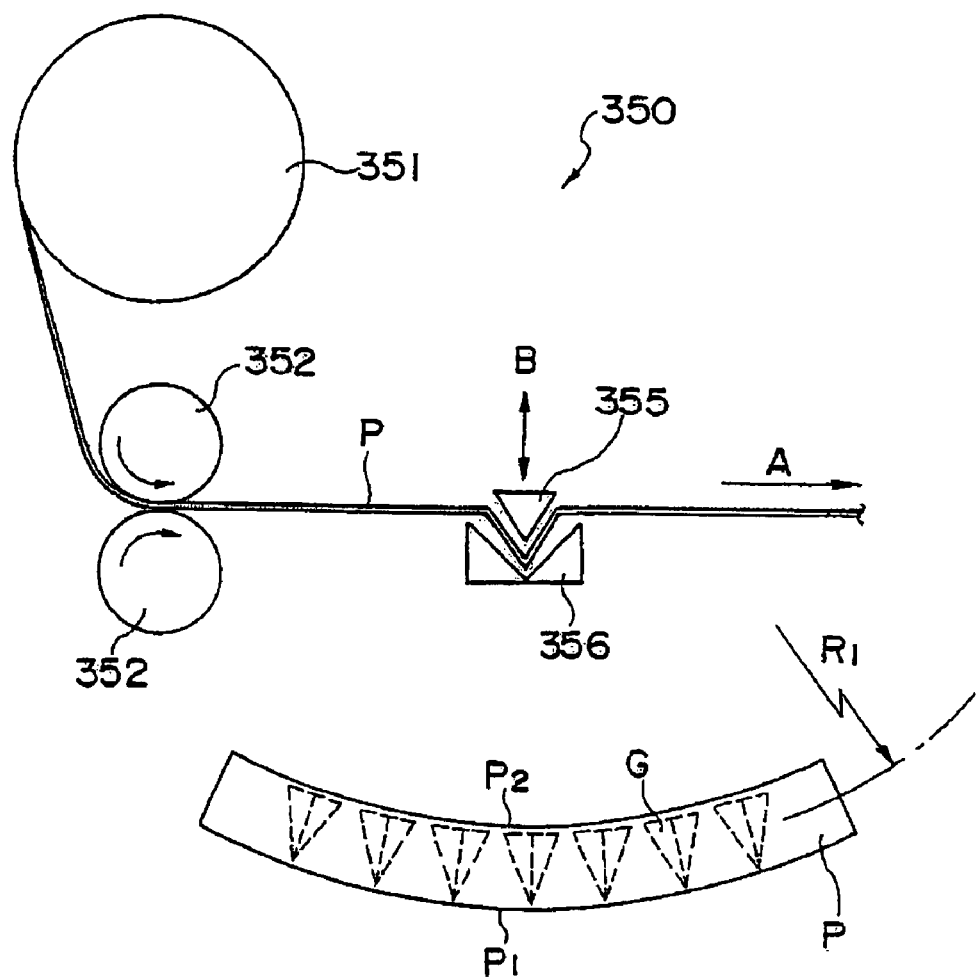
FIG. 8 is an explanatory view showing the gathering roller.

FIG. 8 is an explanatory view showing the structure of the gathering roller 350.

The prepreg sheet laminated body P fed from the prepreg sheet feeder 351 is sandwiched between a pair of feed rollers 352 and transmitted in the arrow A direction.

The feed rollers 352 are driven via a servomotor, and the feeding quantity is controlled thereby.

The prepreg sheet laminated body P is sandwiched between an upper mold 355 and a lower mold 356, by which a gather (crease) G is provided thereto.

The carbon fiber contained in the prepreg sheet laminated body P is not stretchable, but by creasing the body, it can be shrunk in the longitudinal direction.

Therefore, by providing a gather G deeper on one side $P_2$ than on the other side $P_1$ of the prepreg sheet body P, the prepreg sheet body P can be bent to have a radius of curvature $R_1$ with respect to a plane.

FIG. 9 is an explanatory view showing the structure of the 45-degree bending roller 320 and 90-degree bending roller 330.

The 45-degree bending roller 320 comprises a frame 321 disposed above the core 10, a press roller 322 fixed to the frame 321 for pressing the laminated body P located on the upper surface of the core 10, and a bend roller 324 for bending both sides of the laminated body P for 45 degrees along the core 10. The pressing force of the press roller 322 can be controlled via a pressurizing spring 323.

The laminated body having passed through the 45-degree bending roller 320 and having both ends bent by 45 degrees enters the 90-degree bending roller 330.

The 90-degree bending roller 330 comprises a frame 331, a press roller 332 fixed to the frame 331 for pressing the laminated body P located on the upper surface of the core 10, and a bend roller 324 for bending both sides of the laminated body P for 90 degrees along the core 10.

The pressing force of the press roller 332 can be controlled via a pressurizing spring 323, and the pressing force of the bend roller 324 can be adjusted via a pressurizing spring 325.

Figure 10A:
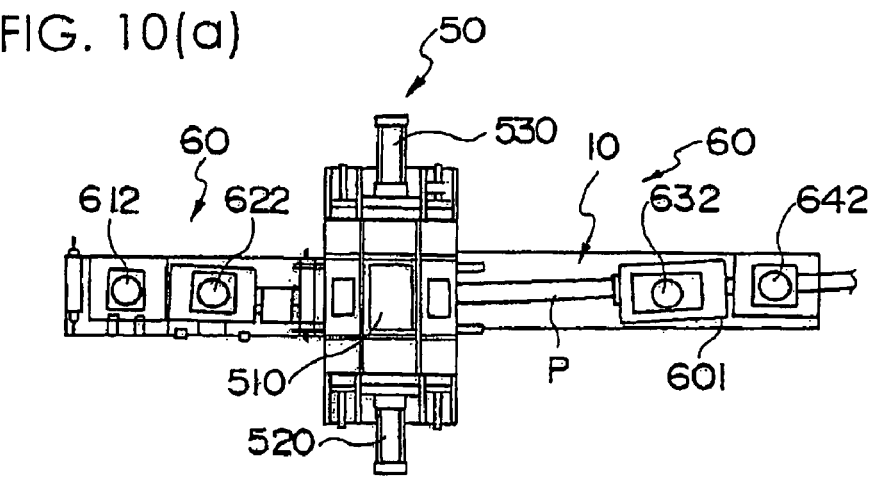
FIG. 10 is an explanatory view of the hot press and pullers.
Figure 10B:
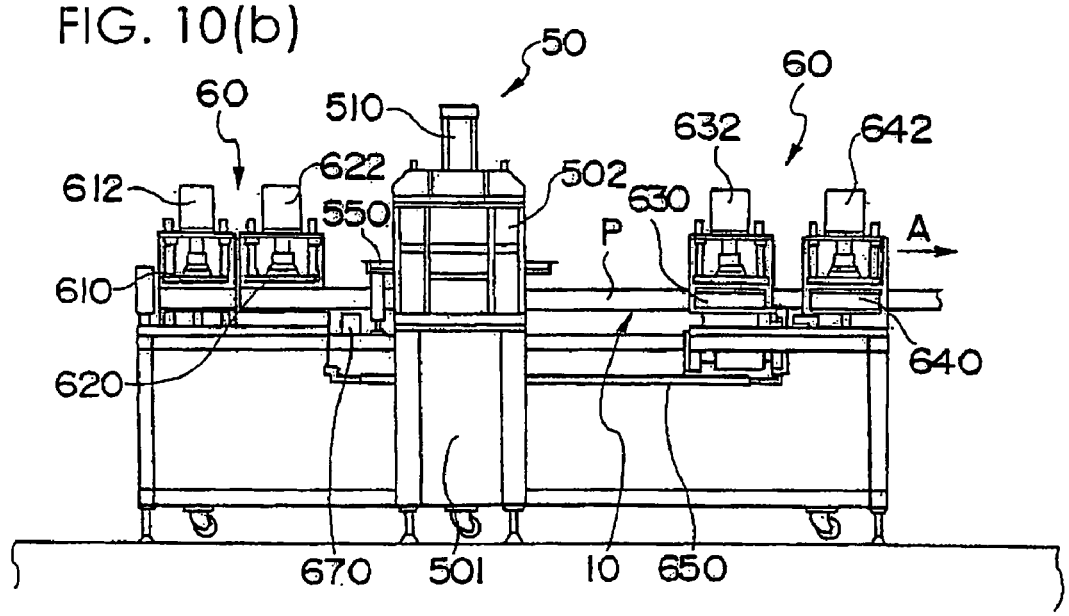

FIG. 10 is an explanatory view showing the structure of the hot press device 50 and the pullers 60, 60 for the laminated body.

The hot press device 50 comprises a hot press unit 502 equipped above a frame 501. Inside the hot press unit 502 are equipped molds for heating and pressing the laminated body P transmitted along the core 10, and the molds are pressed by piston cylinder units 510, 520 and 530, respectively.

When a predetermined hot press treatment is completed, the laminated body P on the core 10 is transferred for a predetermined distance.

The pullers 60 are disposed before and after the hot press device 50 so as to pull the laminated body P.

The pullers 60 comprise gripping devices 610, 620, 630 and 640 that move back and forth along the arrow A direction on the table 601.

The two gripping devices 610 and 620 disposed on the upstream side of the hot press device 50 each comprise a cylinder unit 612 or 622, and hold the laminated body P.

Similarly, the two gripping devices 630 and 640 disposed on the downstream side of the hot press device 50 each comprise a cylinder unit 632 or 642, and hold the laminated body P.

The upstream gripping devices 610, 620 and the downstream gripping devices 630, 640 are connected via a rod 650, by which the devices move in the arrow A direction in synchronism.

By this movement, the laminated body P within the hot press device 50 is pulled for a predetermined length.

A sensor 670 is disposed on the entrance side of the hot press device 50 for accurately measuring the distance of movement of the laminated body P.

According to this distance of movement of the laminated body P, accurate lengths of release films and prepreg sheets are supplied.

According to the above-explained construction, the laminated body P passing through the hot press device is heated and pressed with no tension added thereto.

Thus, thermosetting of the laminated body with a curvature can be performed without disarranging the alignment of the reinforcing fiber. Thus, the strength of the reinforcing fiber is maintained by the completed product.

After exiting the hot press device 50, the laminated body P is sent into a postcure device 70, where thermosetting of the laminated body is completed in a furnace.

Figure 12A:
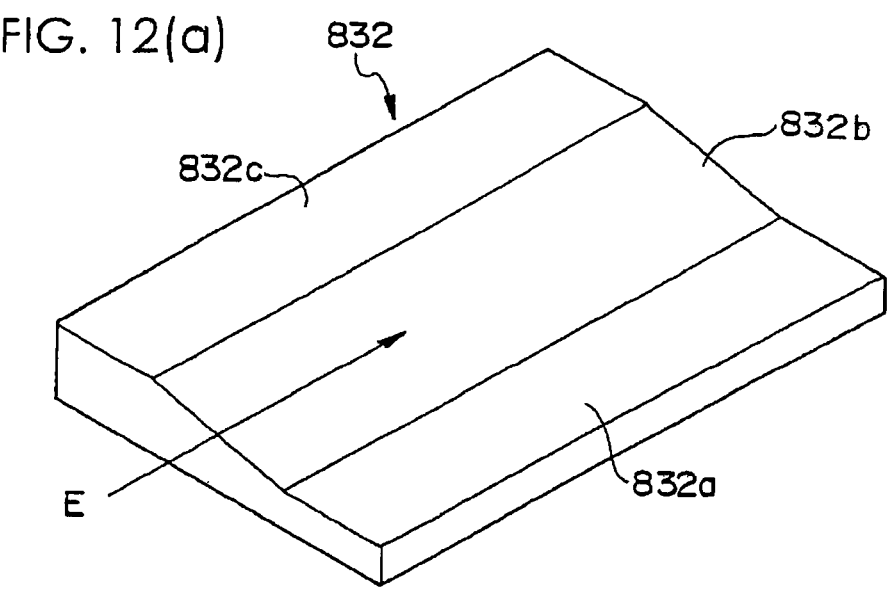
FIG. 12 is an explanatory view of the mold for the release film forming device.
Figure 12B:
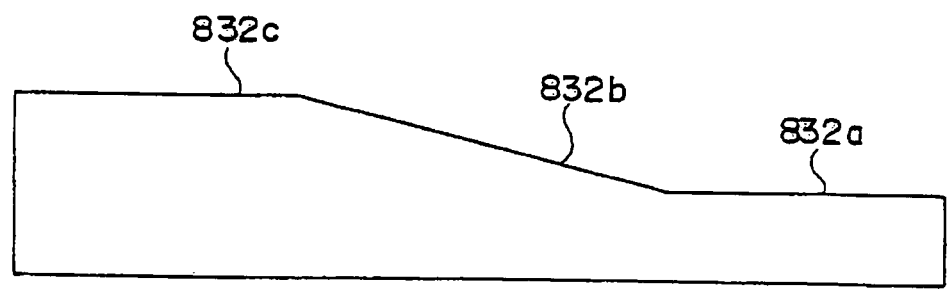

FIG. 11 is an explanatory view showing the forming device of the release film, and FIG. 12 is an explanatory view showing the forming mold of the release film.

Since the molding apparatus according to the present invention is designed to manufacture a member having a curvature, it is preferable that the release films disposed on the top and bottom surfaces of the prepreg sheet is curved along the core. Therefore, the present invention comprises a device for preforming the release film in advance.

The forming device of the release film designated as a whole by reference number 80 comprises a frame 800, and a feeding reel 810 and a winding reel 820 of a release film $S_1$ disposed on the frame. The feeding reel 810 comprises a brake 812 for placing appropriate tension on the release film $S_1$. The winding reel 820 comprises a motor 822 for winding in the release film $S_1$.

The release film $S_1$ provided from the feeding reel 810 passes through a film bending mold device 830. Rollers 830a and 830b for pulling down the film are disposed before and after the mold device 830.

FIG. 12 is an explanatory view showing the structure of the mold 832 equipped within the mold device 830. The mold 832 comprises a first planar surface 832a and a second planar surface 832c, and the planar surfaces are connected via an inclined surface 832b. The first planar surface 832a is located at a lower position than the second planar surface 832c.

The release film is transmitted on the mold 832 in the direction of arrow E. Since the release film is pulled down by rollers 830a and 830b disposed in front of and behind the mold, the release film passing the side of the upper planar surface 832c is drawn more. Thus, the formed release film $S_1$ has a curvature within a plane.

The release film $S_1$ having passed through the mold device 830 enters a creasing roller 840, where creases corresponding to the shape of the member are formed to the film in the longitudinal direction.

The release film $S_1$ passes through a film holding unit 850 and a guide roller 860.

The release film $S_1$ is thus preformed, so a member having a curvature within a plane can be formed efficiently.

Figure 13:
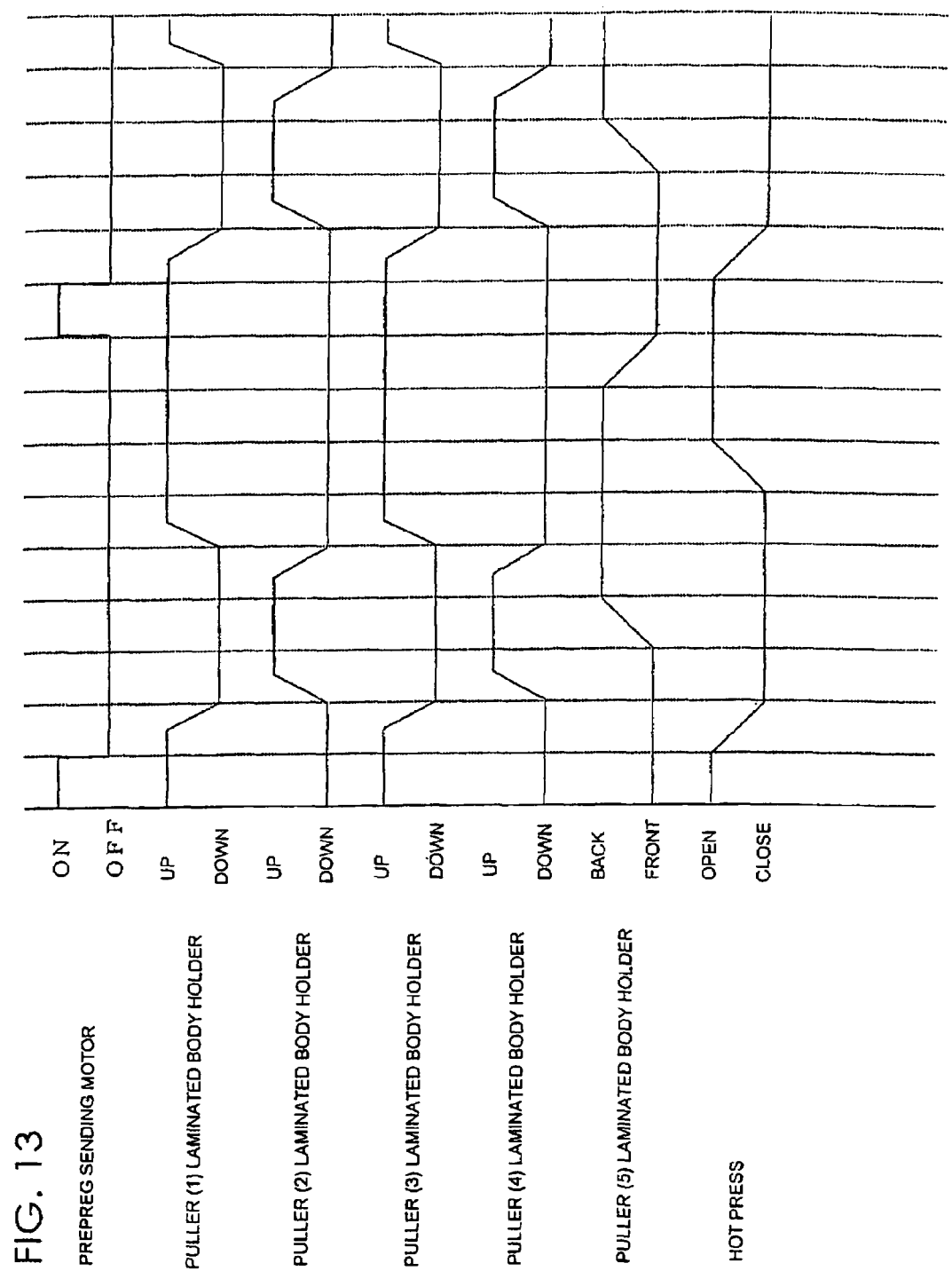
FIG. 13 is a time chart showing the operation of the continuous molding apparatus.

FIG. 13 is a time chart showing the operations of the motor for sending out the prepreg sheet, the pullers and the hot press.

FIG. 14 is an explanatory view showing other examples of the cross-sectional shapes of the fiber reinforced plastic members having a curvature formed by the molding apparatus of the present invention Product Wa has an L-shaped cross section, and Wb has an H-shaped cross section. Product Wc has a Z-shaped cross section, and Wd has a hat-shaped cross section.

As explained, the present invention enables to form a fiber reinforced prepreg material into a member having a curvature, which can be applied to forming a structural member of an aircraft required to be both strong and light weight.

What is claimed is:

1. A continuous molding apparatus for molding a fiber reinforced plastic member with a curvature utilizing a core having a shape corresponding to the shape of the member with a curvature and disposed on a plane, the apparatus comprising:
   a device for feeding a release film deformed in advance to correspond to the curvature of the molded member;
   a device for feeding plural sheets of semi-cured prepreg material formed by impregnating carbon fiber or glass fiber with thermosetting resin;
   a device for laminating and deforming the prepreg into a predetermined shape;
   a hot press device for heating and pressing the laminated and deformed release film and laminated body into a predetermined shape;
   a puller disposed before and after the hot press device for gripping the laminated body and introducing the same into the hot press device; and
   a postcure device for heating the laminated body exiting the hot press device; wherein
   the hot press is performed while preventing tension from being placed on the fiber in the prepreg.

2. The apparatus for continuously molding a fiber reinforced plastic member with a curvature according to claim 1, wherein the device for feeding the prepreg comprises a mechanism for reeling out a specific amount of prepreg by sensing the amount of movement of the laminated body.

3. The apparatus for continuously molding a fiber reinforced plastic member with a curvature according to claim 1, wherein the puller for gripping the laminated body and introducing the same into the hot press device is interlocked with the hot press device, so that the puller moves the laminated body for a specific amount of distance when a mold of the hot press device is opened.

* * * * *